US010597130B2

(12) United States Patent
Antao et al.

(10) Patent No.: US 10,597,130 B2
(45) Date of Patent: Mar. 24, 2020

(54) TROLLING MOTOR WITH A TRANSDUCER ARRAY (71) Applicant: NAVICO HOLDING AS, Egersund (NO)

(72) Inventors: Barry M. Antao, Owasso, OK (US); Jeremiah Clark, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 29 days.

(21) Appl. No.: 15/214,968

(22) Filed: Jul. 20, 2016

(65) Prior Publication Data

US 2016/0325814 A1 Nov. 10, 2016

Related U.S. Application Data (63) Continuation-in-part of application No. 14/598,122, filed on Jan. 15, 2015, now abandoned.

(51) Int. Cl.
B63H 20/00 (2006.01)
G01S 15/89 (2006.01)
G10K 11/00 (2006.01)
G01S 7/56 (2006.01)
G01S 15/96 (2006.01)
(Continued)

(52) U.S. Cl.
CPC .......... B63H 20/007 (2013.01); B63H 20/32 (2013.01); G01S 7/56 (2013.01); G01S 15/89 (2013.01); G01S 15/8902 (2013.01); G01S 15/96 (2013.01); G10K 11/008 (2013.01); G10K 11/346 (2013.01); G10K 2200/10 (2013.01); G10K 2200/11 (2013.01)

(58) Field of Classification Search
CPC ....... B63H 20/007; G01S 15/89; G01S 15/96; G01S 15/8902
See application file for complete search history.

(56) References Cited

U.S. PATENT DOCUMENTS 4,737,940 A * 4/1988 Arringotn ............ B63H 20/007
181/140
4,939,700 A 7/1990 Breton
4,970,700 A 11/1990 Gilmour et al.
(Continued)

FOREIGN PATENT DOCUMENTS

GB 2294763 A 5/1996
JP 01-118791 A 5/1989
(Continued)

OTHER PUBLICATIONS

U.S. Appl. No. 14/717,458, filed May 20, 2015.
(Continued)

Primary Examiner — Andrew Polay
(74) Attorney, Agent, or Firm — Nelson Mullins Riley & Scarborough LLP (57) ABSTRACT Various implementations described herein are directed to a trolling device having a motor with a propeller coupled to the motor and a shaft configured to couple or mount the motor to a watercraft. The trolling device may include a housing encapsulating the motor and the housing may include a nosecone. A sonar transducer assembly may be incorporated within the housing or nosecone including a phased array configured to transmit sonar beams into an underwater environment.

18 Claims, 6 Drawing Sheets (51) Int. Cl.
*B63H 20/32* (2006.01)
*G10K 11/34* (2006.01)

(56) References Cited

U.S. PATENT DOCUMENTS

| | | | |
|---|---|---|---|
| 5,077,699 A | 12/1991 | Passamante et al. | |
| 5,184,330 A | 2/1993 | Adams et al. | |
| 5,200,931 A | 4/1993 | Kosalos et al. | |
| 5,260,912 A | 11/1993 | Latham | |
| 5,525,081 A * | 6/1996 | Mardesich | B63H 20/007 114/144 E |
| 5,530,680 A | 6/1996 | Whitehurst | |
| 5,537,380 A | 7/1996 | Sprankle et al. | |
| 5,568,152 A | 10/1996 | Janky et al. | |
| 5,675,552 A | 10/1997 | Hicks et al. | |
| 5,793,703 A | 8/1998 | Shippey | |
| 5,805,528 A * | 9/1998 | Hamada | G01S 7/6227 367/111 |
| 5,812,494 A | 9/1998 | Medeiros | |
| 5,923,617 A | 7/1999 | Thompson et al. | |
| 6,160,764 A | 12/2000 | Powell | |
| 6,449,215 B1 | 9/2002 | Shell | |
| 6,652,331 B2 | 11/2003 | Healey | |
| 6,909,946 B1 | 6/2005 | Kabel et al. | |
| 6,995,527 B2 | 2/2006 | DePasqua | |
| 7,113,449 B2 | 9/2006 | Fairbairn | |
| 7,369,459 B2 | 5/2008 | Kawabata et al. | |
| 7,542,376 B1 | 6/2009 | Thompson et al. | |
| 7,606,114 B2 | 10/2009 | Bachelor et al. | |
| 7,652,952 B2 * | 1/2010 | Betts | G01S 7/521 367/88 |
| 7,729,203 B2 | 6/2010 | Betts et al. | |
| 7,755,974 B2 | 7/2010 | Betts et al. | |
| 7,889,600 B2 | 2/2011 | Thompson et al. | |
| 8,295,393 B2 | 10/2012 | Wantanabe et al. | |
| 8,300,499 B2 | 10/2012 | Coleman et al. | |
| 8,305,840 B2 * | 11/2012 | Maguire | G01S 15/89 367/88 |
| 8,305,844 B2 | 11/2012 | DePasqua | |
| 8,486,968 B2 | 7/2013 | Priepke et al. | |
| 8,514,658 B2 | 8/2013 | Maguire | |
| 8,605,550 B2 | 12/2013 | Maguire | |
| 8,645,012 B2 | 2/2014 | Salmon et al. | |
| 8,711,140 B1 | 4/2014 | Mallet | |
| 8,717,847 B2 | 5/2014 | Blake | |
| 8,761,976 B2 | 6/2014 | Salmon et al. | |
| 8,767,509 B2 | 7/2014 | Freking et al. | |
| 8,879,359 B2 | 11/2014 | DePasqua | |
| 8,953,647 B1 | 2/2015 | Mead et al. | |
| 9,132,900 B2 | 9/2015 | Salmon et al. | |
| 9,201,142 B2 | 12/2015 | Antao | |
| 9,335,412 B2 | 5/2016 | Proctor | |
| 9,405,028 B2 | 8/2016 | Bloor | |
| 9,495,764 B1 | 11/2016 | Boardman et al. | |
| 9,664,783 B2 | 5/2017 | Brown et al. | |
| 9,766,328 B2 | 9/2017 | Black et al. | |
| 9,784,825 B2 | 10/2017 | Brown et al. | |
| 9,784,826 B2 | 10/2017 | Matson et al. | |
| 9,812,118 B2 | 11/2017 | Matson et al. | |
| 2002/0071345 A1 | 6/2002 | Chiang et al. | |
| 2002/0126576 A1 | 9/2002 | Douma et al. | |
| 2002/0188200 A1 | 12/2002 | Mauchamp et al. | |
| 2003/0081503 A1 | 5/2003 | Barnard et al. | |
| 2003/0235112 A1 | 12/2003 | Zimmerman et al. | |
| 2005/0007880 A1 | 1/2005 | Zimmerman et al. | |
| 2005/0036404 A1 | 2/2005 | Zhu et al. | |
| 2005/0093859 A1 | 5/2005 | Sumanaweera et al. | |
| 2005/0099892 A1 | 5/2005 | Greelish | |
| 2005/0101867 A1 | 5/2005 | Johnson et al. | |
| 2005/0270901 A1 | 12/2005 | Swanson | |
| 2006/0186889 A1 | 8/2006 | Andreis | |
| 2007/0025183 A1 | 2/2007 | Zimmeu | |
| 2007/0159922 A1 | 7/2007 | Zimmerman et al. | |
| 2007/0223306 A1 | 9/2007 | Toennessen | |
| 2007/0223307 A1 | 9/2007 | Storteig | |
| 2007/0291589 A1 | 12/2007 | Kawabata et al. | |
| 2008/0080308 A1 | 4/2008 | Hornby | |
| 2008/0239870 A1 | 10/2008 | Dubuis et al. | |
| 2009/0037040 A1 | 2/2009 | Salmon et al. | |
| 2009/0052277 A1 | 2/2009 | Swanson | |
| 2009/0073804 A1 | 3/2009 | Laws et al. | |
| 2009/0103595 A1 | 4/2009 | Watanabe et al. | |
| 2009/0147623 A1 | 6/2009 | Betts et al. | |
| 2010/0014386 A1 | 1/2010 | Thompson et al. | |
| 2010/0103775 A1 | 4/2010 | Betts et al. | |
| 2011/0013484 A1 | 1/2011 | Coleman et al. | |
| 2011/0013485 A1 * | 1/2011 | Maguire | G01S 15/89 367/88 |
| 2011/0038227 A1 | 2/2011 | Kostov | |
| 2011/0128162 A1 | 6/2011 | Klepsvik | |
| 2012/0014220 A1 | 1/2012 | DePasqua | |
| 2012/0099395 A1 | 4/2012 | Debrunner et al. | |
| 2012/0106299 A1 | 5/2012 | Rowe et al. | |
| 2012/0195471 A1 | 8/2012 | Newcombe et al. | |
| 2012/0309755 A1 | 12/2012 | Priepke et al. | |
| 2013/0044569 A1 | 2/2013 | DePasqua | |
| 2013/0148471 A1 | 6/2013 | Brown et al. | |
| 2013/0173163 A1 | 7/2013 | Zhandov et al. | |
| 2013/0208568 A1 * | 8/2013 | Coleman | G01S 7/521 367/88 |
| 2013/0215719 A1 | 8/2013 | Betts et al. | |
| 2013/0242700 A1 | 9/2013 | Blake | |
| 2014/0010048 A1 | 1/2014 | Proctor | |
| 2014/0010049 A1 | 1/2014 | Proctor | |
| 2014/0200815 A1 | 7/2014 | Hung et al. | |
| 2014/0269192 A1 * | 9/2014 | Proctor | G01S 15/8902 367/88 |
| 2014/0336854 A1 | 11/2014 | Salmon et al. | |
| 2015/0003689 A1 | 1/2015 | Sheiman et al. | |
| 2015/0066450 A1 | 3/2015 | Charlesworth et al. | |
| 2015/0078123 A1 | 3/2015 | Batcheller | |
| 2015/0097838 A1 | 4/2015 | Steward et al. | |
| 2015/0130797 A1 | 5/2015 | Chen et al. | |
| 2015/0294660 A1 * | 10/2015 | Stokes | G01S 15/96 367/173 |
| 2015/0325043 A1 | 11/2015 | Bromley et al. | |
| 2015/0355373 A1 | 12/2015 | Zhuo et al. | |
| 2016/0003008 A1 | 1/2016 | Uribe et al. | |
| 2016/0011310 A1 | 1/2016 | Horner et al. | |
| 2016/0104359 A1 | 4/2016 | AlMahmoud | |
| 2016/0123499 A1 | 5/2016 | Lewis | |
| 2016/0207602 A1 | 7/2016 | Clark | |
| 2016/0232884 A1 | 8/2016 | Parks | |
| 2016/0259053 A1 | 9/2016 | Proctor et al. | |
| 2016/0320474 A1 | 11/2016 | Proctor et al. | |
| 2016/0325814 A1 | 11/2016 | Clark et al. | |
| 2016/0341827 A1 | 11/2016 | Horner et al. | |
| 2016/0377716 A1 | 12/2016 | Proctor et al. | |
| 2017/0123062 A1 | 5/2017 | Coleman et al. | |
| 2017/0212230 A1 | 7/2017 | Wigh et al. | |
| 2018/0281914 A1 | 10/2018 | Burton et al. | |
| 2019/0064348 A1 | 2/2019 | Clark et al. | |

FOREIGN PATENT DOCUMENTS

| | | |
|---|---|---|
| JP | 01-216288 A | 8/1989 |
| JP | 11-153667 A | 6/1999 |
| JP | 2008-508539 A | 3/2008 |
| JP | 2009-068881 A | 4/2009 |
| WO | WO 2003/001231 A2 | 1/2003 |
| WO | WO 2006/017511 A2 | 2/2006 |
| WO | WO 2011/008430 A1 | 1/2011 |
| WO | WO 2013/126761 A1 | 8/2013 |
| WO | WO 2014/144471 A1 | 9/2014 |

OTHER PUBLICATIONS

U.S. Appl. No. 14/683,573, filed Apr. 10, 2015.
U.S. Appl. No. 14/702,121, filed May 1, 2015.
Wesmar SS39 Seriers Sonar Product literatire; Feb. 2012; http://www.wesmar.com/productbrochures/wesmar_ss395_web.pdf.
Botton Line Finshin' Buddy Product Literature; Jul. 14, 1999.

(56) References Cited

OTHER PUBLICATIONS

Furuno Model CH-18 Color Searchlight Sonar Product Literatire; Feb. 18, 1989.
Christophe Sintes, et al; Interferometric Side Scan Sonar: A Tool for High Resolution Sea Floor Exploration; Technical Lessons Learnt from the Erika Incident and Other Oil Spills, Brest, Mar. 13-16, 2002; pp. 1-15.
DePasqua; Humiminbird 360 Degree Sonar, <https://www.youtube.com/watch?v=VetZhhulQ0Y>, Feb. 26, 2012.
European Search Report for European Application No. EP 16158998 dated Jul. 20, 2016.
Simrad; ForwardScan® Transducer [online] [Retrieved Mar. 25, 2015]. Retrieved from <URL:http://www.simrad-yachting.com/en-GB/Products/Echosounders/Transducers/ForwardScan-Transducer-en-gb.aspx> . 3 pages.
Furuno; Full-Circle Scanning Sonar FSV-30, [online] [retrieved Apr. 18, 2013] Retrieved from the Internet: <URL: http://www.furuno.com/en/business-product/detail/marine/index.php?prdcd=FSV-30&category=sonar&business=fishing>.
Furuno CH-28 360° Scanning Sonar, 8 pages.
Furuno, Operator's Manual, Color Searchlight Sonar; Model CH-28; Furuno Electric Co., Ltd.; Nishinomiya, Japan; First Edition Jan. 1991; 44 pages.
Gerard Llort-Pujol et al., "A New Approach for Fast and High-Resolution Interfometric Bathymetry", IEEE Oceanic Engineering Society Newsletter, Summer 2006, pp. 12-19.
Giardina; Interferometric Synthetic Aperture Sonar Signal Processing for Autonomous Underwater Vehicles Operating Shallow Water; University of New Orleans Theses and Dissertations; Dec. 15, 2012; Retrieved from the Internet: URL:http://scholarworks.uno.edu/cgi/viewcontent.cgi?article=2587&context=td (retrieved on Jul. 7, 2016).
H. Koyama et al., "Bathymetry by new designed interferometry sonar mounted on AUV", Oceans 2004, MTS/IEEE Techno-Ocean Mar. 14, 2005; pp. 1169-1174.
H.D. Griffiths, et al.; Interferometric Synthetic Aperture Sonar for High-Resolution 3-D Mapping of the Seabed; IEE Proceedings—Radar, Sonar and Navigation; vol. 144, No. 2; Apr. 1997; pp. 96-103.
Humminbird, "Trolling Motor Mounted Transducer", © 2013 Johnson Outdoors Marine Electronics, Inc.; pp. 1-4.
International Search Report and Written Opinion from International Application No. PCT/US2014/023984, dated Sep. 1, 2014.
ITC Application Equations for Underwater Sound Transducers, International Transducer Corporation (1995) Rev. 8/00, 3 pages.
NOAA; Office of Coast Survey; Phase Dfferencing Bathymetric Sonar [online] [Retrieved May 5, 2015]. Retrieved from the Internet: . 2 pages.
Office Action for Japanese Application No. 2014-051465 dated Jul. 27, 2015.
Office Action for Japanese Application No. 2014-051465 dated Mar. 2, 2016.
Office Action from Japanese Patent Application No. 2014-051465 dated Feb. 23, 2015.

Roy Edgar Hansen, et al.; Signal Processing for AUV Based Interferometric Synthetic Aperture Sonar; Oceans 2003, MTS/IEEE Proceedings Celebrating the Past, Teaming Toward the Future; San Diego, CA; Sep. 22-26, 2003; Oceans MTS/IEEE Conference Proceedings, Columbia, MD; Marine Techn. Soc., Sep. 22, 2003; pp. 2438-2444.
Second Written Opinion of the International Preliminary Examining Authority from International Application No. PCT/US2014/023984, dated Mar. 5, 2015.
Simrad Introduces Forwardscan [online] [retrieved Nov. 25, 2014]. Retrieved from the Internet: <URL: http://www.simrad-yachting.com/en-US/Pressreleases/2014/Simrad-Introduces-Forwardscan/>. (dated Feb. 25, 2014) 2 pages.
Hiller, Tom; "Solving the Interferometric Processing Bottleneck" [online] [Retrieved May 5, 2015]. Retrieved from the Internet: <URL: http://www.oicinc.com/Hiller-Solving-Interferometric-Bottleneck.pdf>. 3 pages.
Woods Holde Coastal and Marine Science Center; "Swath Bathymetry System" [online] [Retrieved May 5, 2015]. Retrieved from the Internet: URL:http://woodshole.er.usgs.gov/operations/sfmapping/swath.htm. 2 pages.
WiseGeek, http://www.wisegeek.com/what-is-3d-imaging.htm (2009).
Blakenship; "Sensing Orientation;" *Servo Magazine*; Jul. 2016; retrieved Mar. 28, 2019 from https://www.servomagazine.com/magazine/article/July2016_Sensing-Orientation-for-Balance.
"Understanding Sensors: Magnetometers, Accelerometers and Gyroscopes;" *Virtual Reality Society*; retrieved Mar. 28, 2019 from https://www.vrs.org.uk/virtual-reality-gear/motion-tracking/sensors.html.
Bottom Line Fishin' Buddy 2255 Manual.
Bottom Line Fishin' Buddy product literature; Feb. 2001.
Botton Line fishin' Buddy Product Literature; Jul. 14, 1999.
Caputi; Power to the People (4 Look Ahead, Interphase iScan 180); Saltwater Sportsman; Sep. 21, 2007; http://www.saltwatersportsman.com/power-people.
D'Amico, et al.; A Brief History of Active Sonar; Aquatic Mammals; vol. 35, No. 4; pp. 426-434; 2009; http://csi.whoi.edu/sites/default/files/literature/Full%20Text.pdf.
Furuno Model CH-18 Color Searchlight Sonar Product Literature; Feb. 18, 1989.
Furuno Model CH-28 Installation Manual; Apr. 10, 1998.
Furuno Model CH-28 Operator's Manual; Dec. 28, 1996.
Furuno Model CH-28 Product Literature.
Furuno Model CH-37BB Color Sector Scanning Sonar product literature; Jan. 2012.
Humminbird 360 Imaging advertising literature excerpts; pp. 10-11 and 52-53.
Interphase Sea Scout Product Literature; 1994.
Wesmar SS395 Series Sonar Product literature; Feb. 2010; http://www.wesmar.com/productbrochures/wesmar_ss395_web.pdf.
Wesmar SS90B High Frequency Scanning Sonar Product Literature and Wesmar Pricing Information; Mar. 1, 1980.

* cited by examiner

TROLLING MOTOR WITH A TRANSDUCER ARRAY

CROSS REFERENCE TO RELATED APPLICATION

This application claims priority to and is a continuation-in-part of U.S. patent application Ser. No. 14/598,122, entitled "Nosecone Transducer Array," filed Jan. 15, 2015, which is incorporated by reference herein in its entirety.

BACKGROUND

This section is intended to provide information to facilitate an understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

When trolling for fish, a secondary motor may be used as means of propulsion for trolling purposes. Typically, a trolling motor is a self-contained device coupled to an angler's watercraft and is useful for precise positioning in a body of water.

SUMMARY

Described herein are implementations of various technologies for a trolling motor including a transducer array. In one implementation, a device may include a motor, a propeller coupled to the motor, and a shaft configured to couple the motor to a watercraft. The device may include a housing including a nosecone. The housing may encapsulate the motor and transducer array or the transducer array may be incorporated within the nosecone.

Described herein are also implementations of various technologies for a trolling motor. In one implementation, a trolling motor may include an electric motor having a propeller coupled thereto and a steering shaft configured for coupling the electric motor to a watercraft. The trolling motor may include a housing encapsulating the electric motor.

Described herein are also implementations of various technologies for a system having a nosecone transducer array. In one implementation, the system may include a trolling device configured to be coupled to a watercraft. The trolling device may include a motor having a propeller coupled thereto. The trolling device may include a housing enclosing the motor within a waterproof capsule. The housing may include a nosecone with a transducer array incorporated therein or the transducer array may be located elsewhere in the housing. In an example embodiment, the housing may include a transducer assembly including a plurality of transducer arrays. The trolling device may include a steering shaft configured for coupling the housing to the watercraft. The steering shaft may include a first electrical wire for transmitting sonar signals from the transducer array. The system may include a computing device electrically coupled to the trolling device via the first electrical wire. The computing device may include a processor and memory having instructions that cause the processor to record sonar data associated with the sonar signals received from the transducer array via the first electrical wire.

An example embodiment of the present invention includes a device including a motor, a propeller coupled to the motor, and a shaft configured to couple the motor to a watercraft. The shaft is configured to rotate relative to the watercraft, wherein the shaft defines an internal passage. The device also includes a housing that encapsulates the motor and includes at least one transducer array. The at least one transducer array includes a phased array configured to transmit one or more sonar beams into an underwater environment. The device also includes at least one electrical cable that leads from the transducer array through the internal passage of the shaft to enable electrical signals to be transmitted between the transducer array and a computing device. The electrical cable is contained within the internal passage of the shaft so as to protect the electrical cable while still enabling rotation of the shaft and housing.

In some example embodiments, the housing includes a nosecone, wherein the at least one transducer array is disposed in the nosecone.

In an example embodiment, the at least one transducer array further includes at least one of a right scanning transducer array, a left scanning transducer array, a down scanning transducer array, a conical down beam transducer array, or a second phased array.

In some example embodiments, the phased array comprises a plurality of transducer elements affixed to a printed circuit board (PCB), wherein each of the plurality of transducer elements is electrically connected to traces on the PCB, wherein each of the plurality of transducer elements is configured to receive sonar returns from the underwater environment.

In an example embodiment, an angle with respect to a water line corresponding to an object in the underwater environment is determined based on a phase difference between sonar returns associated with the object that are received at two or more transducer elements of the phased array. In some example embodiments, an angle with respect to a water line corresponding to an object in the underwater environment is determined based on relative positions and known distances between two or more transducer elements of the phased array and the two or more transducer elements each received a sonar return associated with the object. In an example embodiment, the determined angle corresponding to the object is used to generate a three-dimensional position of the object in the underwater environment.

In some example embodiments, the motor includes an electric motor and the electric motor is configured to drive the propeller to provide thrust for the watercraft in a body of water during operation of the electric motor.

In an example embodiment, the housing comprises a hydrodynamic projection and the at least one transducer array is disposed in the hydrodynamic projection.

In some example embodiments, the device also includes an EMF damper disposed between the motor and the transducer array.

In an example embodiment, the housing encloses the motor within a waterproof capsule impervious to water.

In some example embodiments, the shaft is configured to rotate the housing relative to the watercraft to thereby rotate the at least one transducer array 360° for imaging a 360° view of an underwater environment below a surface of a body of water.

In an example embodiment, the shaft comprises at least one electrical cable for controlling operation of the motor, wherein the operation of the motor is controlled electrically or mechanically via user input or by the computing device.

In some example embodiments, the device may be associated with a system including a marine electronic device including a display. The display is configured to display a sonar image based on one or more sonar returns received by the phased array from the underwater environment. In an example embodiment, an angle with respect to a water line corresponding to an object in the underwater environment is determined based on a phase difference between sonar returns associated with the object that are received at two or more transducer elements of the phased array and the display is further configured to display a three-dimensional image that includes the object, wherein the object is positioned within the image based on the determined angle with respect to the water line corresponding to the object.

Example trolling motors, systems, and methods of the present invention may also include additional embodiments, such as described above with respect to the example device.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques are described herein with reference to the accompanying drawings. It should be understood, however, that the accompanying drawings illustrate only the various implementations described herein and are not meant to limit the scope of various techniques described herein.

DETAILED DESCRIPTION

Various implementations of incorporating a sonar transducer array within a trolling motor will now be described in reference to FIGS. 1-4.

Figure 1:
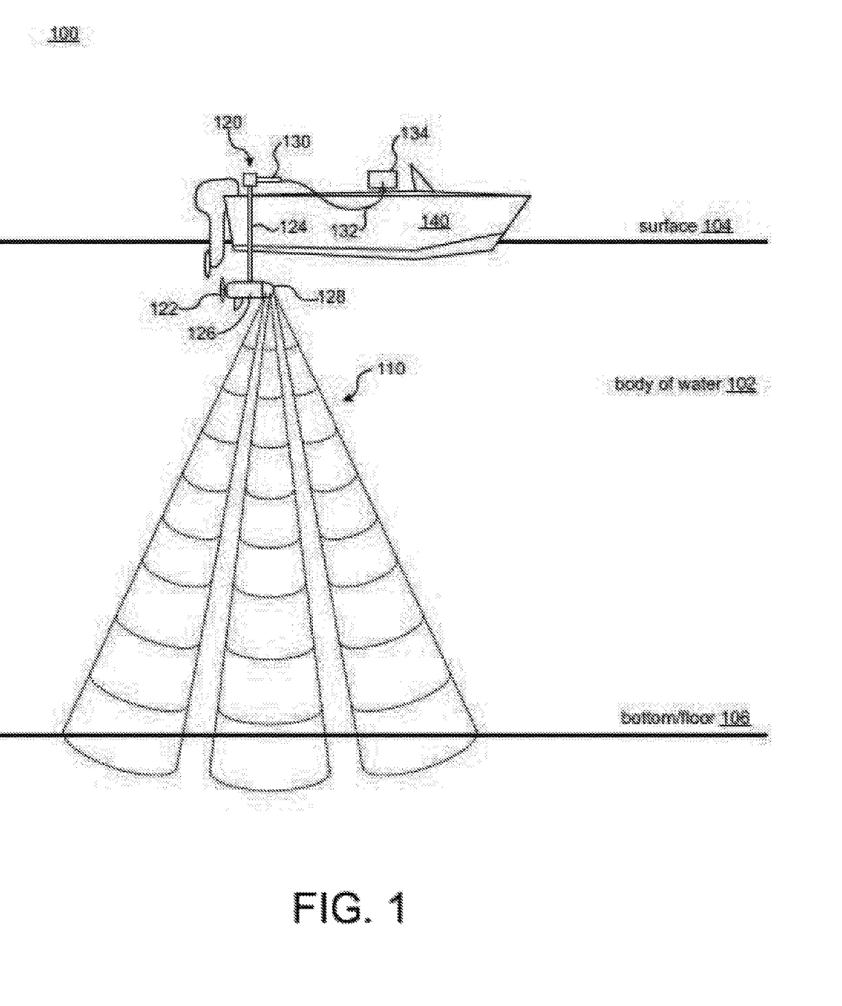
FIG. 1 illustrates a view of using a trolling motor in accordance with various implementations described herein.

FIG. 1 illustrates a view of using a trolling motor 120 in accordance with various implementations described herein.

Figure 2A:
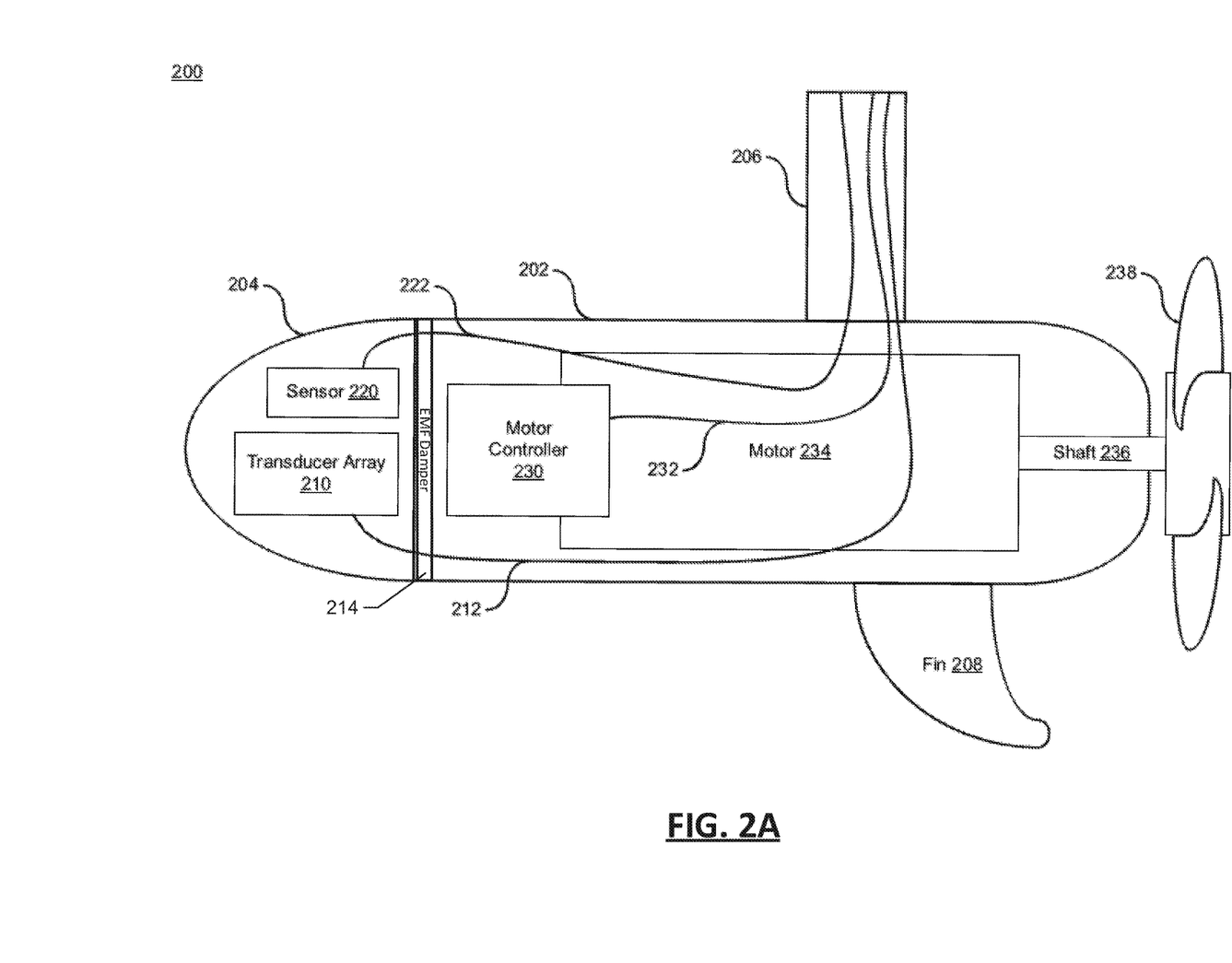
FIGS. 2A and 2B illustrate diagrams of trolling motors in accordance with various implementations described herein.
Figure 2B:
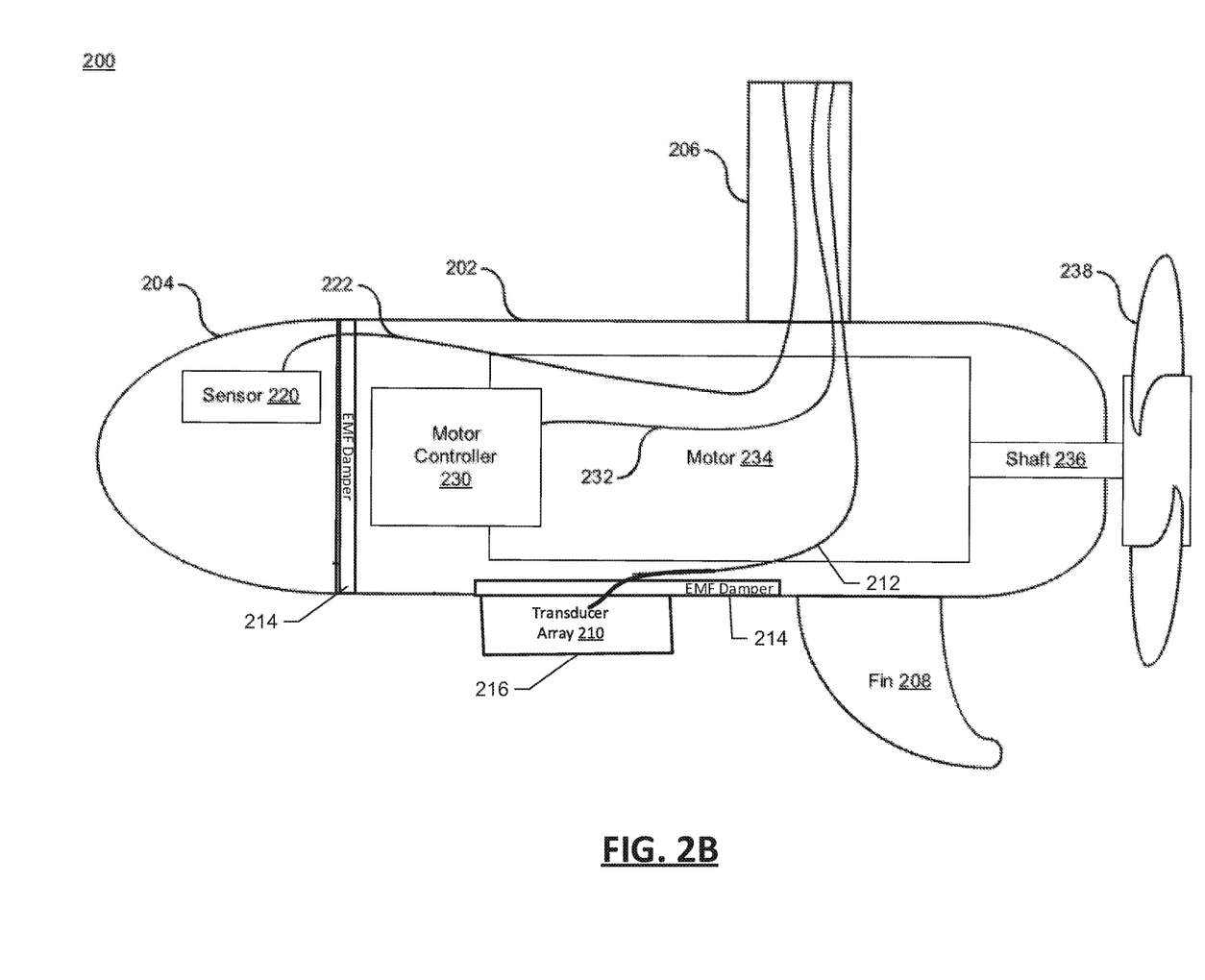

In some implementations, the trolling motor 120 includes a device having a motor (not shown) with a propeller 122 coupled thereto and a shaft 124 coupling the motor to a watercraft 140 (e.g., boat). As shown in FIG. 1, the trolling motor 120 may be coupled or mounted to a stern of the watercraft 140. In some instances, the trolling motor 120 may be coupled or mounted to another part of the watercraft 140, such as, e.g., a bow of the watercraft 140 or some other useful part of the watercraft 140. During operation, the motor is configured to drive the propeller 122 to provide thrust for the watercraft 140 in water, such as a body of water 102. The shaft 124 may be configured to rotate relative to the watercraft 140 to allow steering of the watercraft 140 via user interaction with a handle 130 in the body of water 102 during operation of the motor. In some examples, the trolling motor 120 may include use of a manually operated steering mechanism; however, in other examples, the trolling motor may use a motorized mechanism for steering, which may include use of a cable steer type trolling motor or an electric steer type trolling motor. The trolling motor 120 includes a housing 126 that encapsulates the motor, and the housing 126 in turn, includes a nosecone 128. A transducer array, such as depicted in FIGS. 2A and 2B, may be incorporated within the housing 126 or nosecone 128. In some example embodiments, the trolling motor 120 may include a transducer assembly including one or more transducer arrays, each of which may be housed within the housing 126 and/or the nosecone 128. The housing 126 may be configured to enclose the motor within a waterproof capsule that is impervious to water. The housing 126 and the nosecone 128 may be formed with a hydrodynamic profile or hydrodynamic contour, such as a torpedo shape.

As shown in FIG. 1, the trolling motor 120 is a stand-alone device that may be coupled to the watercraft 140 and deployed in the body of water 102. The watercraft 140 may be configured to float on a surface 104 of the body of water 102. During operation, the one or more transducer arrays incorporated within the nosecone 128 and/or the housing 126 may be configured for imaging various environmental features (e.g., fish, plants, rocks, etc.) in the body of water 102. This imaging may include mapping an underwater environment below the surface 104 of the body of water 102 between the surface 104 and a bottom or floor 106 of the body of water 102. The shaft 124 may be configured to rotate the housing 126 relative to the watercraft 140 via user interaction with the handle 130 to rotate the nosecone 128 (including the incorporated transducer array) at least 360° for imaging a 360° view of the underwater environment below the surface 104 of the body of water 102.

As shown in FIG. 1, one or more sonar beams 110 may be generated by multiple sonar transducer arrays of the transducer assembly that is incorporated within the nosecone 128 and/or the housing 126 of the trolling motor 120 when deployed in the body of water 102. Each of the transducer arrays may include one or more transducer elements. One example transducer array may be a forward scanning sonar transducer array including spotlight scan transducers that are built-in to the nosecone 128. The spotlight scan transducers may be referred to as forward scanning sonar transducers. In some instances, the transducer assembly may include one or more of a right forward scanning element, a left forward scanning element, a conical sonar element, and/or a bar downscan sonar element, which may be housed inside the nosecone 128 and/or the housing 126.

In some example embodiments the transducer assembly may include a phased transducer array, e.g. a "phased array," which may be housed inside the nosecone 128 or housing 126. The phased array may include a plurality of transducer elements arranged on a PCB. The PCB may mechanically support and electrically connect the electronic components, including the transducer elements using conductive tracks (e.g. traces), pads, and other features. In some embodiments, the conductive tracks may comprise traces etched onto the circuit board. The conductive tracks may comprise sets of traces, for example, each transducer element may be mounted to the PCB such that the transducer element is in electrical communication with a set of traces. For example, the terminals of a transducer element may be soldered or otherwise electrically connected and mechanically secured to one or more pads of a PCB wherein each pad is in electrical communication with a trace etched onto the circuit board. For example, each transducer element may comprise one or more silver-plated terminals or other conductive material-plated terminals. Thus, each transducer element may be in electrical communication with a set of traces comprising the PCB (e.g., via the transducer element terminals). Each transducer element, sub-array, and/or the array of transducer elements may be configured to transmit one or more sonar pulses and/or receive one or more sonar returns. The arrangement of the phased array is discussed further in FIGS. 2B and 2C.

The transducer arrays or individual transducer elements of the phased array may transmit one or more sonar beams into a body of water with a transmit transducer, a transmit/receive transducer, or similar device. When the sound waves strike anything of differing acoustic impedance (e.g., the sea floor or something suspended in the water above the bottom), the sound waves reflect off that object. These echoes or sonar returns may strike a sonar transducer or a separate sonar receiver element, which converts the echoes back into an electrical signal which is processed by a processor (e.g., sonar signal processor 342 as discussed in reference to FIG. 3) and sent to a display (e.g., an LCD) mounted in the cabin or other convenient location in the boat. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment. In some embodiments, a more complex array may be used to generate a picture in a single sounding.

In an example embodiment, the transducer assembly may include multiple transducer arrays and/or transducer elements cooperating to receive sonar returns from the underwater environment. The transducer arrays and or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a three-dimensional position of the sonar returns (and, for example, a corresponding object in the underwater environment).

In some example embodiments, the returns from a plurality of the transducer arrays and/or transducer elements may be compared via the process of interferometry to generate one or more angle values. Interferometry may involve determining the angle to a given sonar return via a phase difference between the returns received at two or more transducer arrays and/or transducer elements. In some embodiments, the process of beamforming may be used in conjunction with the plurality of transducer arrays and/or transducer elements to generate one or more angle values associated with each sonar return. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. patent application Ser. No. 14/717,458, entitled "Sonar Systems using Interferometry and/or Beamforming for 3D Imaging" and U.S. patent application Ser. No. 14/683,573, entitled Systems and Associated Methods for Producing a 3D Sonar Image," both of which are assigned to the Assignee of the present application and are hereby incorporated by reference herein in their entireties.

In some implementations, the transducer arrays and/or transducer elements of the transducer assembly are each capable of generating a separate sonar beam 110. The sonar beams 110 may include, for example, one or more of a conical beam projection and a linear beam projection (though other beam shapes are contemplated). For instance, the sonar beams 110 may include a conical downscan beam projection having a coverage area of a beam produced by a circular downscan transducer. In another instance, the sonar beams 110 may include a linear downscan beam projection having a coverage area of a beam produced by a linear downscan transducer.

In some implementations, the trolling motor 120 may be electrically coupled to a computing device 134 via one or more electrical wires or cables 132 passing through the shaft 124. The computing device 134 may be a marine electronics device (e.g., multi-function display (MFD), smart phone, etc.) for recording sonar data signals received from the transducer array via the electrical cables 132. The computing device 134 may also be configured for controlling operation of the motor via the electrical cables 132. Thus, control signals may be transmitted from the computing device 134 to the motor via the electrical cables 132 for controlling operation of the motor. In some instances, operation of the motor is controlled by the computing device 134 including user interaction with the computing device 134. In some other instances, operation of the motor may be controlled via user interaction with a foot-pedal (not shown) positioned on the watercraft 140.

FIG. 2A illustrates a block diagram of a trolling motor 200 in accordance with various implementations described herein. In various implementations, the trolling motor 200 may include and/or incorporate use of various types of electrically and/or mechanically steered trolling motors. In some instances, some trolling motors may be electrically steered via a remote device, foot pedal, or multi-functional display (MFD). In other instances, some trolling motors may be mechanically steered via a handheld tiller type control or a mechanical cable steered foot pedal.

The trolling motor 200 may include a transducer assembly including one or more transducer arrays 210. The trolling motor 200 includes a device having a housing 202 configured to encapsulate a motor 234. The housing 202 includes a nosecone 204 and a transducer array 210 incorporated within the nosecone 204. The trolling motor 200 includes a propeller 238 coupled to the motor 234 via a drive shaft 236. The trolling motor 200 includes a steering shaft 206 that couples the motor 234 (and housing 202) to a watercraft (e.g., a boat). The motor 234 may include an electric motor, and the motor 234 may be configured to drive the propeller 238 in water to provide thrust for the watercraft in a body of water 102 during operation of the electric motor. The trolling motor 200 may include a fin 208 for stability in water during movement.

In an example embodiment, such as depicted in FIG. 2A, the trolling motor 200 may include a transducer array 210, such as a phased array disposed in the nosecone 204. In some example embodiments, the trolling motor 200 may include a transducer assembly including multiple transducer arrays 220. The multiple transducer arrays 210 may be disposed within the nose cone 204 in the housing 202, as described below, other locations on or in the trolling motor 200, or a combination thereof.

Additionally or alternatively, one or more of the transducer arrays 210, such as a phased array, down scanning transducer array, or side scanning transducer array, may be housed in the housing 202. As depicted in FIG. 2B, the housing 202 may be shaped to house the transducer array 210, such as a hydrodynamic projection 216 from the bottom and/or sides of the housing 202. In some embodiments, the transducer array 210 may be disposed within the housing 202 without alteration to the hydrodynamic, e.g. torpedo shape. For example, in an instance in which the transducer array 210 is a phased array, there may be sufficient space to house the PCB between the motor 234 and the housing 202 or the circumference of the motor housing may be increased to allow sufficient space to house the transducer array 210.

In some example embodiments, the trolling motor 200 may also include an electromagnetic field (EMF) damper 214. The EMF damper 214 may be positioned between the motor 234 and electronic components within the housing 202, such as the one or more transducer arrays 210, the one or more sensors 220, and/or the motor controller 230. The EMF damper 214 may include one or more EMF shielding materials, such as fabrics, textiles, plastics, glass, paints, foils, ribbon, or wire, configured to reduce or prevent electromagnetic interference caused by an electromagnetic field produced by the motor 234.

The steering shaft 206 may incorporate use of a first electrical cable 232 for controlling operation of the motor 234 via a motor controller 230. Operation of the motor 234 may be controlled by a variable power supply, such as a foot-pedal, that provides variable control signals to the motor controller 230, and the motor controller 230 relays the variable control signals to the motor 234 to drive the motor 234. In another instance, operation of the motor 234 may be controlled by an external computing device, such as the computing device 134 in FIG. 1. In this instance, the external computing device may provide variable control signals to the motor controller 230, and the motor controller 230 relays the variable control signals to the motor 234 to drive the motor 234.

The steering shaft 206 may incorporate use of a second electrical cable 212 for transmitting sonar data signals from the transducer array 210 to a computing device, such as the computing device 134 in FIG. 1. The transducer assembly may include a spotlight transducer assembly having multiple scanning transducer arrays. The transducer assembly may include multiple transducer arrays 210 including one or more of a right scanning transducer array, left scanning transducer array, a down scanning transducer array, a conical down beam transducer array, and/or a phased array. The sonar data generated and transmitted by the transducer assembly may be used for imaging environmental features in the body of water 102.

Generally, the term sonar (i.e., SOund Navigation And Ranging) refers to various techniques for propagating sound underwater to detect objects on or under a surface of a body of water, such as fish, plants, rocks, sea floor, etc. One type of sonar technology refers to active sonar that is configured to emit pulses of sound waves while receiving echoes, which refers to pinging. Sonar may be used to determine acoustic locations and/or measurements of echo characteristics for targets and objects in a body of water. Further, acoustic frequencies used in sonar based devices may vary from low frequency (i.e., infrasonic) to high frequency (i.e., ultrasonic).

As discussed above, the transducer assembly may include multiple transducer arrays 210 that may be configured to use sonar technology to evaluate attributes of a target object by interpreting echoes from sound waves. In various implementations, each transducer array may be configured to actively generate low and/or high frequency sound waves and evaluate echoes received back to thereby measure time intervals between sending signals and receiving corresponding echoes to determine distance to target objects. Each transducer array may be configured to convert energy into sound waves using piezoelectric transducer elements or capacitive transducer elements that are configured to convert electrical energy into sound. Each piezoelectric transducer element may be configured to use piezoelectric crystals that include a property of changing size when voltage is applied, whereby applying an alternating current (AC) across the piezoelectric crystals may cause oscillations at high frequencies, to thereby generate high frequency sound waves. In some instances, focusing sound waves generated by each piezoelectric transducer element may be determined by an area and shape of each sonar transducer element, a sound wave frequency of each piezoelectric transducer element, and a sound velocity of the propagation medium, such as a body of water. In some instances, each piezoelectric transducer element may use piezoelectric crystals configured as transceivers to transmit and detect sound waves in one or more elements, such as propagating sound waves and receiving echoing sound waves.

The trolling motor 200 may include one or more sensors 220 incorporated within the nosecone 204. Further, the steering shaft 206 may incorporate use of a third electrical cable 222 for transmitting sensor data signals from the one or more sensors 220 to a computing device, such as the computing device 134 in FIG. 1. The one or more sensors 220 may include a dedicated sensor (e.g., water sensor) configured for sensing deployment/removal of the trolling motor 200 in/from the body of water 102. For instance, the dedicated sensor may include electrode terminals (not shown) configured to activate (e.g., power-up) the transducer assembly or transducer array 210 when the trolling motor 200 is deployed in water. The electrode terminals may be configured to deactivate (e.g., power-down) the transducer assembly or transducer array 210 when the trolling motor 200 is removed from water. The one or more sensors 220 may include one or more environmental sensors, such as a temperature sensor. Additionally or alternatively, the one or more sensors 220 may include an orientation or direction sensor.

Figure 2C:
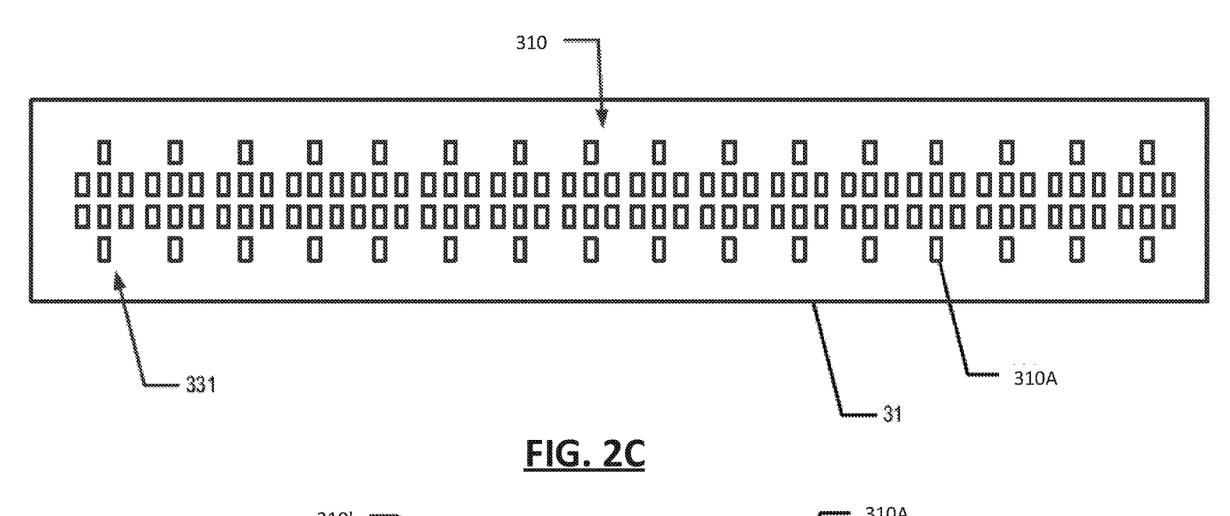
FIGS. 2C and 2D illustrate diagrams of an arrangement of transducer elements on a printed circuit board (PCB) of a phased array in accordance with various implementations described herein.
Figure 2D:
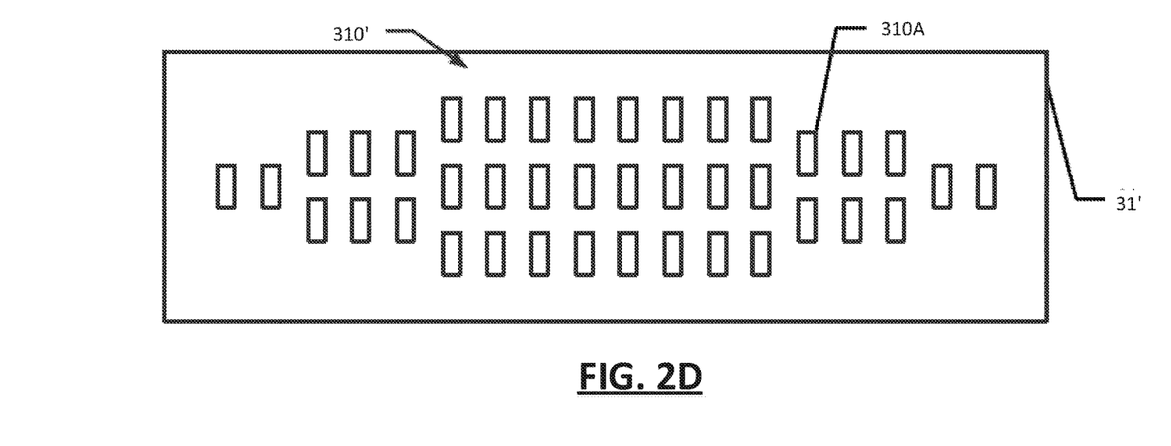

FIGS. 2C and 2D illustrate examples of transducer arrays, particularly, phased arrays 310, 310' comprising transducer elements 310A mounted to a PCB 31, 31'. In various embodiments, each of the transducer elements 310A may be substantially rectangular in shape and made from a piezoelectric material such as a piezoelectric ceramic material. While depicted and described embodiments generally detail a substantially rectangular in shape element that is made of piezoelectric material, other shapes and types of material are equally applicable to example embodiments of the piezoelectric material 310A. In various embodiments, the processor 342 may be communication with the PCB having the transducer elements 310A mounted thereto by means of connectors such as card edge connectors and/or the like.

In some example embodiments, the phased array 310 may include a plurality of sub-arrays 331. Each sub-array 331 may include a portion of the transducer elements 310A of the phased array. The transducer elements 310A of the sub-array 331 may be configured in a particular pattern and the transducer element pattern may repeat two or more times across the transducer array 310.

In various embodiments, the PCB 31, 31' may have a fiberglass or other rigid substrate. In other embodiments, the PCB 31, 31' may be a flexible PCB. For example, the PCB substrate may be made of polyester (PET), polyimide (PI), polyethylene napthalate (PEN), Polyetherimide (PEI), or various fluropolymers (FEP) and copolymers Polyimide films.

Each transducer element 310A, sub-array 331, and/or the array of transducer elements, e.g. the phased array 310, 310' may be configured to transmit one or more sonar pulses and/or receive one or more sonar returns. Both transmitting a sonar pulse and receiving a sonar return requires the transducer element 310A to be able to vibrate at least enough to convert one or more electrical pulses into a sonar pulse or to convert a sonar return into an electrical signal. In various embodiments, the vibrations of one or more transducer elements 310A may cause the PCB 31 to which the one or more transducer elements 310A are mounted to vibrate. The vibration of the PCB 31, and possible subsequent vibration of other transducer elements 310A mounted to the PCB 31 may need to be taken into account in the determining of a pulse transmitted by the phased array 310, 310' or in the processing of a sonar return received by the phased array 310, 310'. For example, the transducer elements 310A mounted to the PCB 31, 31' may be configured such that a signal may be received from each transducer element 310A or sub-array 331 individually. In addition to differentiating the sonar returns and/or transmission, individual wiring may enable use of processing techniques that are helpful in determining the location (e.g., polar angle coordinate) of an object/surface causing the sonar return, as discussed in U.S. patent application Ser. No. 14/702,121, entitled "Transducer Having Surface Mounted Elements and Associated Methods," which is assigned to the Assignee of the present invention and hereby incorporated by reference herein in its entirety.

In various embodiments, each transducer element 310A may be approximately one mm by one mm. In various embodiments, each transducer element 310A may be approximately 0.4 by 0.2 mm to 100 mm by 150 mm. In one embodiment, each transducer element 310A is approximately 0.5 mm in height. In various embodiments, each transducer element 310A is approximately 0.2 mm to 1 mm. In various embodiments the spacing between transducer elements 310A may be 0.25 mm or less. In other embodiments, the spacing between the transducer elements 310A may be greater than 0.25 mm. In various embodiments, smaller or larger transducer elements 310A may be used, as appropriate for the application.

In various embodiments, the phased array 310, 310' may have any shape. In some embodiments, the phased array 310, 310' may have a shape that would be difficult to fabricate using a single transducer element 310A. For example, the phased array 310, 310' may comprise a diamond-shaped array or two or more diamond-shaped sub-arrays 331, an oblong array having tapered ends, and/or the like. FIG. 2C illustrates an example embodiment in which the phased array 310 comprises sixteen diamond-shaped sub-arrays 331. The diamond-shaped sub-arrays 331 are arranged such that the central axis of each of the diamond-shaped sub-arrays 331 is parallel and/or aligned with the central axis of the other diamond-shaped sub-arrays. Each diamond-shaped sub-array 331 comprises eight transducer elements 310A. FIG. 2D illustrates an example embodiment in which the phased array 310' comprises an oblong-shaped array with tapered ends (e.g., football-shaped). The phased array 310, 310' may comprise variously shaped arrays and/or sub-arrays 331 of transducer elements 310A, as applicable for the application.

In one embodiment, the phased array 310, 310' may comprise a line of two or more parallel lines of transducer elements 310A. The beam shape and/or beam characteristics of the phased array 310, 310' may be configured to approximate the beam shape and/or beam characteristics of a single ceramic element. For example, the transducer array may be configured to approximate the beam shape and/or characteristics of a single linear downscan transducer element, as described in U.S. patent application Ser. No. 13/370,633, entitled "Sonar System for Reduced Interference," which is assigned to the Assignee of the present application and hereby incorporated by reference herein in its entirety. Though the above description provides an example of replacing a linear or rectangular transducer elements, other element shapes are contemplated (e.g., a conical transducer element, a square transducer element, etc.).

Figure 3:
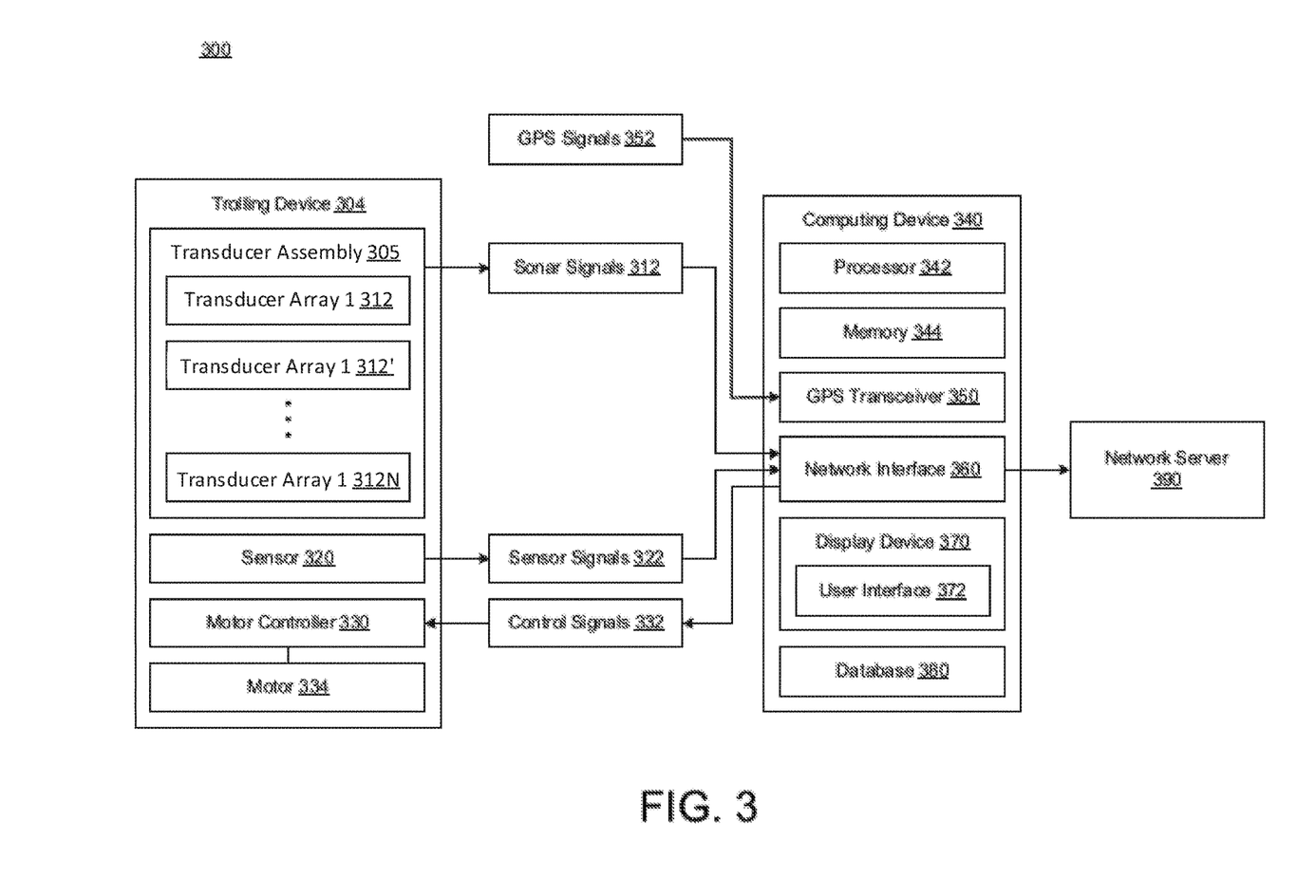
FIG. 3 illustrates a diagram of a transducer system in accordance with various implementations described herein.

FIG. 3 illustrates a block diagram of a transducer system 300 in accordance with implementations of various techniques described herein.

The transducer system 300 includes a trolling device 304, a computing device 340, and a network server 390. The trolling device 304 and the computing device 340 are coupled to a watercraft, e.g., boat. The trolling device 304 may be a trolling motor, and the computing device 340 may be a marine electronics device, a multi-function display (MFD), a smart phone, etc.

The trolling device 304 includes a transducer assembly 305. The transducer assembly 305 may include multiple transducer arrays 312, 312', . . . , 312N, which may include one or more of a right scanning transducer array, a left scanning transducer array, a down scanning transducer array (e.g., bar or linear downscan transducer array), a conical down beam transducer array, and a phased array. As discussed above, each of the transducer arrays 312 may include one or more transducer elements. The trolling device 304 includes one or more sensors 320. The one or more sensors 320 may include one or more environmental sensors, such as a water sensor, temperature sensor, or an orientation sensor. The trolling device 304 includes a motor 334 controlled with a motor controller 330.

The computing device 340 includes a processor 342 and memory 344 including instructions that cause the processor 342 to process and record sonar data associated with sonar signals 312 received from the transducer assembly 305 via a network interface 360. The instructions may further cause the processor 342 to process and record sensor data associated with sensor signals 322 received from the one or more sensors 320 via the network interface 360. The instructions may further cause the processor 342 to generate control signals 332 for controlling operation of the motor 334 via the motor controller 330 and the network interface 360.

The computing device 340 may include a global positioning system (GPS) transceiver 350 configured to receive GPS signals 352 from a global positioning satellite system, relay antenna, or the like. The memory 344 may include instructions that cause the processor 342 associate GPS data (related to the GPS signals 352) with the sonar data (related to the sonar signals 312) received from the transducer array 310.

In some examples, the computing device 340 may be configured to upload data (e.g., sonar data, sensor data, GPS data, etc.) to a network server 390 (e.g., cloud server) via the network interface 360. The network server 390 may include memory and/or at least one database on a network (e.g., cloud based network). Further, the computing device 340 may be configured to receive and associate geo-coordinate data, such as the GPS data, to sonar data and/or sensor data at any time, including prior to upload. The network may include various types of communication networks and/or cloud based networks, including wired networks and/or wireless networks.

The computing device 340 may be configured as a special purpose machine for interfacing with the trolling device 304, including the transducer assembly 305 and each of the transducer arrays 312, 312', . . . , 312N. The computing device 304 may include standard elements and/or components, including the processor 342, memory 344 (e.g., non-transitory computer-readable storage medium), at least one database 380, power, peripherals, and various other computing elements and/or components that may not be specifically shown in FIG. 3. The computing device 340 may include a display device 370 (e.g., a monitor or other display) that may be used to provide a user interface (UI) 372, including a graphical user interface (GUI). The display 370 may be incorporated as part of the computing device 340 or may be a separate component. The UI 372 may be used to receive preferences and/or input controls from a user of the display device 370 for managing and/or utilizing the system 300, such as interfacing with the trolling device 304 and the transducer array 304 and controlling operation of the motor 334 via the motor controller 330. Various other elements and/or components of the system 300 that may be useful for the purpose of implementing the system 300 may be added, included, and/or interchanged, in manner as described herein.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

Marine Electronics Device

Figure 4:
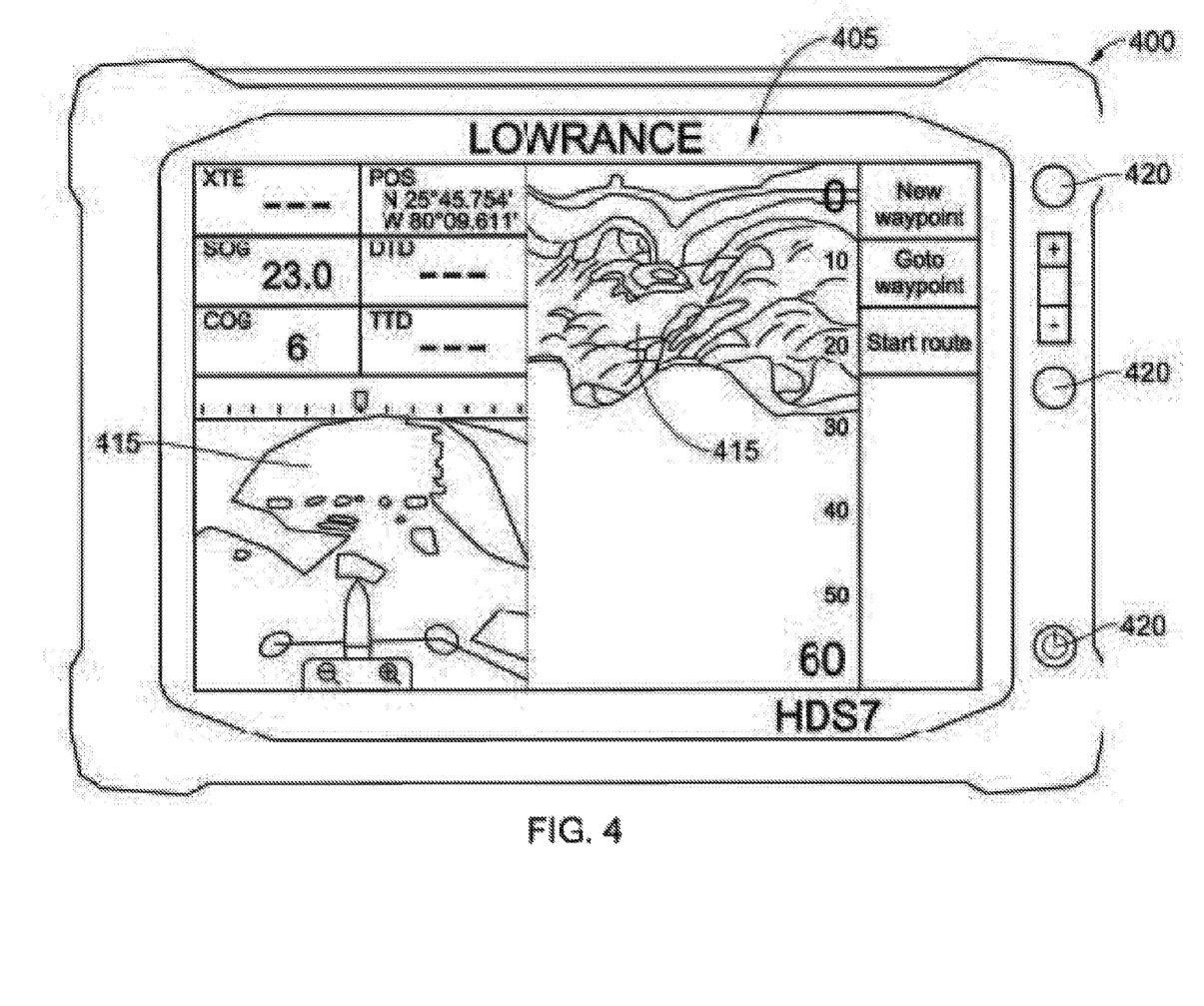
FIG. 4 illustrates a schematic of a marine electronics device in accordance with various implementations described herein.

FIG. 4 illustrates an example schematic of a marine electronics device 400 in accordance with implementations of various techniques described herein. The marine electronics device 400 includes a screen 405. In certain implementations, the screen 405 may be sensitive to touching by a finger. In other implementations, the screen 405 may be sensitive to the body heat from the finger, a stylus, or responsive to a mouse. The marine electronics device 400 may be attached to a National Marine Electronics Association (NMEA) bus or network. The marine electronics device 400 may send or receive data to or from another device attached to the NMEA 2000 bus. For example, the marine electronics device 400 may transmit commands and receive data from a motor or a sensor using an NMEA 2000 bus. In one implementation, the marine electronics device 400 may be capable of steering a vessel and controlling the speed of the vessel, i.e., autopilot. For example, one or more waypoints may be input to the marine electronics device 400, and the marine electronics device 400 may steer a vessel to the one or more waypoints. The marine electronics device 400 may transmit or receive NMEA 2000 compliant messages, messages in a proprietary format that do not interfere with NMEA 2000 compliant messages or devices, or messages in any other format. In various implementations, the marine electronics device 400 may be attached to various other communication buses and/or networks configured to use various other types of protocols that may be accessed via, e.g., NMEA 2000, NMEA 0183, Ethernet, Proprietary wired protocol, etc. In some implementations, the marine electronics device 400 may communicate with other devices on the vessel via wireless communication protocols.

The marine electronics device 400 may be operational with numerous general purpose or special purpose computing system environments or configurations. The marine electronics device 400 may include any type of electrical and/or electronics device capable of processing data and information via a computing system. The marine electronics device 400 may include a marine instrument, such that the marine electronics device 400 may use the computing system to display and/or process the one or more types of marine electronics data. The marine electronics device 400 may be configured to display marine electronic data 415, such as, e.g., chart data, radar data, sonar data, steering data, dashboard data, navigation data, fishing data, engine data, and the like. Further, the marine electronics device 400 may also include one or more buttons 420 that may include either physical buttons or virtual buttons, or a combination thereof. Still further, the marine electronics device 400 may receive input through a screen 405 sensitive to touch or buttons 420.

The computing system may include a central processing unit (CPU), a system memory, a graphics processing unit (GPU), and a system bus that couples various system components including the system memory to the CPU. The computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for a monitor (MFD 400). The monitor (MFD 400) includes a screen 405. In certain implementations, the screen 405 may be sensitive to touching by a finger. In other implementations, the screen 405 may be sensitive to the body heat from the finger, a stylus, or responsive to a mouse.

The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some examples, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for example, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured to be connected to a global positioning system (GPS) receiver system and/or a marine electronics system. The GPS system and/or marine electronics system may be connected via the network interface. The GPS receiver system may be used to determine position data for the vessel on which the marine electronics device 400 is disposed. The GPS receiver system may then transmit the position data to the marine electronics device 400. In other examples, any positioning system known to those skilled in the art may be used to determine and/or provide the position data for the marine electronics device 400.

The marine electronics system may include one or more components disposed at various locations on the vessel. Such components may include one or more data modules, sensors, instrumentation, and/or any other devices known to those skilled in the art that may transmit various types of data to the marine electronics device 400 for processing and/or display. The various types of data transmitted to the marine electronics device 400 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type known to those skilled in the art.

In one implementation, the marine electronics system may include a radar sensor for recording the radar data and/or the Doppler data, a compass heading sensor for recording the heading data, and a position sensor for recording the position data. In a further implementation, the marine electronics system may include a sonar transducer for recording the sonar data, an AIS transponder for recording the AIS data, a paddlewheel sensor for recording the speed data, and/or the like.

The marine electronics device 400 may receive external data via the LAN or the WAN. In one implementation, the external data may relate to information not available from the marine electronics system. The external data may be retrieved from the Internet or any other source. The external data may include atmospheric temperature, tidal data, weather, moon phase, sunrise, sunset, water levels, historic fishing data, and other fishing data.

In one implementation, the marine electronics device 400 may be a multi-function display (MFD) unit, such that the marine electronics device 400 may be capable of displaying and/or processing multiple types of marine electronics data. FIG. 4 illustrates a schematic diagram of an MFD unit in accordance with implementations of various techniques described herein. In particular, the MFD unit may include the computing system, the monitor (MFD 400), the screen 405, and the buttons such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
   a motor;
   a propeller coupled to the motor;
   a shaft configured to couple the motor to a watercraft, wherein the shaft is configured to rotate relative to the watercraft, wherein the shaft defines an internal passage; and
   a housing that encapsulates the motor, wherein the housing comprises at least one transducer array, wherein the at least one transducer array comprises a phased array configured to transmit one or more sonar beams into an underwater environment, wherein the housing further comprises an orientation sensor configured to measure an orientation of the at least one transducer array relative to the watercraft; and
   at least one electrical cable that leads from the transducer array through the internal passage of the shaft to enable electrical signals to be transmitted between the transducer array and a computing device, wherein the electrical cable is contained within the internal passage of the shaft so as to protect the electrical cable while still enabling rotation of the shaft and housing,
   wherein the phased array comprises a plurality of transducer elements affixed to a printed circuit board (PCB), wherein each of the plurality of transducer elements is electrically connected to traces on the PCB, wherein each of the plurality of transducer elements is configured to receive sonar returns from the underwater environment, and wherein the plurality of transducer elements from two or more diamond shaped sub-arrays.

2. The device of claim 1, wherein the housing comprises a nosecone, and wherein the at least one transducer array is disposed in the nosecone.

3. The device of claim 1, wherein the at least one transducer array further includes at least one of a right scanning transducer array, a left scanning transducer array, a down scanning transducer array, a conical down beam transducer array, or a second phased array.

4. The device of claim 1, wherein an angle with respect to a water line corresponding to an object in the underwater environment is determined based on a phase difference between sonar returns associated with the object that are received at two or more transducer elements of the phased array.

5. The device of claim 1, wherein an angle with respect to a water line corresponding to an object in the underwater environment is determined based on relative positions and known distances between two or more transducer elements of the phased array, wherein the two or more transducer elements each received a sonar return associated with the object.

6. The device of claim 5, wherein the determined angle corresponding to the object is used to generate a three-dimensional position of the object in the underwater environment.

7. The device of claim 1, wherein the motor comprises an electric motor, wherein the electric motor is configured to drive the propeller to provide thrust for the watercraft in a body of water during operation of the electric motor.

8. The device of claim 1, wherein the housing comprises a hydrodynamic projection and the at least one transducer array is disposed in the hydrodynamic projection.

9. The device of claim 1, further comprising an EMF damper disposed between the motor and the transducer array.

10. The device of claim 1, wherein the housing encloses the motor within a waterproof capsule impervious to water.

11. The device of claim 1, wherein the shaft is configured to rotate the housing relative to the watercraft to thereby rotate the at least one transducer array 360° for imaging a 360° view of an underwater environment below a surface of a body of water.

12. The device of claim 1, wherein the shaft comprises at least one electrical cable for controlling operation of the motor, wherein the operation of the motor is controlled electrically or mechanically via user input or by the computing device.

13. A trolling motor comprising:
   an electric motor having a propeller coupled thereto;
   a shaft configured for coupling the electric motor to a watercraft, wherein the shaft is configured to rotate relative to the watercraft, wherein the shaft defines an internal passage;
   a housing that encapsulates the motor, wherein the housing comprises at least one transducer array, wherein the at least one transducer array comprises a phased array configured to transmit one or more sonar beams into an underwater environment, wherein the housing further comprises an orientation sensor configured to measure an orientation of the at least one transducer array relative to the watercraft; and
   at least one electrical cable that leads from the transducer array through the internal passage of the shaft to enable electrical signals to be transmitted between the transducer array and a computing device, wherein the electrical cable is contained within the internal passage of the shaft so as to protect the electrical cable while still enabling rotation of the shaft and housing,
   wherein the phased array comprises a plurality of transducer elements affixed to a printed circuit board (PCB), wherein each of the plurality of transducer elements is electrically connected to traces on the PCB, wherein each of the plurality of transducer elements is configured to receive sonar returns from the underwater environment, and wherein the plurality of transducer elements form two or more diamond shaped sub-arrays.

14. The trolling motor of claim 13, wherein the housing comprises a nosecone, and wherein the at least one transducer array is disposed in the nosecone.

15. The trolling motor of claim 13, wherein the at least one transducer array further includes at least one of a right scanning transducer array, a left scanning transducer array, a down scanning transducer array, a conical down beam transducer array, or a second phased array.

16. The trolling motor of claim 13, wherein an angle with respect to a water line corresponding to an object in the underwater environment is determined based on a phase difference between sonar returns associated with the object that are received at two or more transducer elements of the phased array.

17. A system comprising:
a trolling motor comprising:
an electric motor having a propeller coupled thereto;
a shaft configured for coupling the electric motor to a watercraft, wherein the shaft is configured to rotate relative to the watercraft, wherein the shaft defines an internal passage;
a housing that encapsulates the motor, wherein the housing comprises at least one transducer array, wherein the at least one transducer array comprises a phased array configured to transmit one or more sonar beams into an underwater environment, wherein the housing further comprises an orientation sensor configured to measure an orientation of the at least one transducer array relative to the watercraft; and
at least one electrical cable that leads from the transducer array through the internal passage of the shaft to enable electrical signals to be transmitted between the transducer array and a computing device, wherein the electrical cable is contained within the internal passage of the shaft so as to protect the electrical cable while still enabling rotation of the shaft and housing,
wherein the phased array comprises a plurality of transducer elements affixed to a printed circuit board (PCB), wherein each of the plurality of transducer elements is electrically connected to traces on the PCB, wherein each of the plurality of transducer elements is configured to receive sonar returns from the underwater environment, and wherein the plurality of transducer elements form two or more diamond shaped sub-arrays; and
a marine electronic device including a display, wherein the display is configured to display a sonar image based on one or more sonar returns received by the phased array from the underwater environment.

18. The system of claim 17, wherein an angle with respect to a water line corresponding to an object in the underwater environment is determined based on a phase difference between sonar returns associated with the object that are received at two or more transducer elements of the phased array, and
wherein the display is further configured to display a three-dimensional image that includes the object, wherein the object is positioned within the image based on the determined angle with respect to the water line corresponding to the object.

* * * * *